United States Patent [19]
Wooley et al.

[11] Patent Number: 5,165,523
[45] Date of Patent: Nov. 24, 1992

[54] SELECTIVELY REMOVABLE BLOCK AND PUSHER ASSEMBLY AND FEED CHAIN THEREFOR

[75] Inventors: Robert E. Wooley, Charlotte, N.C.; A. Derrell Hightower, Stone Mountain, Ga.

[73] Assignee: National Service Industries, Inc., Atlanta, Ga.

[21] Appl. No.: 813,004

[22] Filed: Dec. 24, 1991

[51] Int. Cl.⁵ ............................................ B65G 19/24
[52] U.S. Cl. ..................................... 198/731; 198/733
[58] Field of Search ........................ 198/728, 731, 733

[56] References Cited

U.S. PATENT DOCUMENTS

| | | | |
|---|---|---|---|
| 1,405,419 | 2/1922 | Joy | 198/731 |
| 2,546,262 | 3/1951 | Hatcher | 198/731 |
| 2,761,548 | 9/1956 | Long | 198/733 |
| 2,787,214 | 4/1957 | Halahan et al. | 271/233 |
| 3,103,275 | 9/1963 | Rollins | 198/733 |
| 3,126,089 | 3/1964 | Hugli | 198/733 |
| 3,760,935 | 9/1973 | Ziegelmeyer | 198/731 |
| 3,961,702 | 6/1976 | Blok | 198/731 |
| 4,466,532 | 8/1984 | Minneman et al. | 198/731 X |
| 4,927,002 | 5/1990 | Springman | 198/731 X |
| 4,950,398 | 8/1990 | Wiegand et al. | 198/731 X |
| 5,088,594 | 2/1992 | Edmondson | 198/731 |

FOREIGN PATENT DOCUMENTS 3305387 8/1984 Fed. Rep. of Germany ...... 198/731

OTHER PUBLICATIONS

"The Super Jet ®" Operator's Manual, Halm Industries, Co., Inc., Cover and pp. 28–31, 31A, and unnumbered page.

Primary Examiner—Robert P. Olszewski
Assistant Examiner—James R. Bidwell
Attorney, Agent, or Firm—Mason, Fenwick & Lawrence

[57] ABSTRACT

A selectively removable block and pusher assembly is provided for a feed chain comprising a plurality of links. At least some of the links are provided with a pair of parallel spaced pins extending transversely therefrom from which the block and pusher assembly is removable. Each block and pusher assembly comprises a block and a pusher removably attached to the block. The block includes a first pair of parallel, spaced bores extending therethrough parallel to its transverse axis for receiving the pins extending from the links, and a retaining member positioned in the block for releasably retaining circumferential grooves formed adjacent the free ends of the pins. The retaining member comprises a flexible and resilient U-shaped spring clip having a pair of spaced legs received in a second pair of spaced bores in the block and an intermediate portion which releasably retains the circumferential grooves in the pins.

14 Claims, 2 Drawing Sheets

SELECTIVELY REMOVABLE BLOCK AND PUSHER ASSEMBLY AND FEED CHAIN THEREFOR

BACKGROUND OF THE INVENTION

1. Field of the Invention

The present invention relates to chain conveyers for printing presses, and more particularly to chain conveyors having easily removable block and pusher assemblies to accommodate different sized workpieces.

2. Related Art

Printing presses for printing individual workpieces are well known. U.S. Pat. No. 2,787,214 to Halahan et al is illustrative of such printing presses, and is incorporated herein by reference in its entirety. Another example of such a printing press is the Super Jet ® printing press manufactured by Halm Industries Company, Incorporated of Glen Head, N.Y.

In such printing presses, the workpieces, such as envelopes, are separated by a suction feeding device and then placed by belts on a chain-driven conveyor. The conveyor carries the workpieces downstream to the printing roller, where the workpieces are inserted between the printing roller and an impression roller. The feed chain, which for example is an ASA standard roller chain, has block and pusher assemblies associated therewith for moving the workpieces down the conveyor.

FIG. 1 illustrates a portion of typical prior art feed chain 10 having a block and pusher assembly 20 attached thereto. Block and pusher assembly 20 comprises a block 22 permanently affixed to feed chain 10 and an adjustable pusher 24 removably affixed to block 22. Block 22 is affixed to feed chain 10 by a pair of pins 26 extending transversely through block 22 and through the rollers 28 of one of the links 30 of chain 10.

A recess 32 is provided in the top of block 22 for receiving pusher 24. Pusher 24 is L-shaped with first and second legs 24a and 24b. An elongated slot 40 is formed in first leg 24a. A pusher screw 42 is inserted through slot 40 and engages a threaded bore (not shown) extending longitudinally through block 22. Second leg 24b extends upwardly from block 22 and carries and registers the workpiece, the trailing or rear edge of the workpiece being held against second leg 24b.

Pusher screw 42 is provided with a socket 50 for engagement with a wrench (not shown) for loosening and tightening screw 42. When screw 42 is loosened, the position of pusher 24, and thereby second leg 24b, can be adjusted relative to the leading and trailing ends 22a and 22b of block 22. Screw 42 can also be removed, to permit removal of pusher 24 from block 22.

Conventionally, pusher and block assemblies 20 are spaced apart from each other such that the second legs 24b of their respective pushers 24 are separated from each other by slightly more than the distance between the leading and trailing edges of the smallest workpieces to be processed by the printing press. For example, if the distance between the leading and trailing edges of the smallest workpiece is six inches, then second legs 24b of pushers 24 will be separated by a distance of slightly more than 6 inches.

Because block and pusher assemblies 20 are not removable from feed chain 10, the only way to accommodate larger workpieces is to remove entirely some of pushers 24. For example, to accommodate workpieces having a distance between their leading and trailing edges of more than six inches and up to twelve inches, every other pusher 24 must be removed. This requires unscrewing and removing the pusher screws 42 from every other block and pusher assembly 20. This procedure is labor-intensive, and therefore time-consuming and expensive. It is the solution of this and other problems to which the present invention is directed.

SUMMARY OF THE INVENTION

It is therefore a primary object of this invention to provide a block and pusher assembly for use with a feed chain for printing presses which can easily be removed from the feed chain and then easily replaced on the feed chain.

It is another object of this invention to provide a feed chain adapted to receive a removable block and pusher assembly.

These and other objects of the invention are achieved by the provision of a feed chain comprising a plurality of links and a block and pusher assembly selectively removable from certain of the links. At least some of the links are provided with a pair of parallel spaced pins extending transversely therefrom, the pins having circumferential grooves formed therein adjacent their free ends. Block and pusher assemblies are selectively removable and replaceable on the pins.

Each block and pusher assembly comprises a block and a pusher removably attached to the block. The block has a longitudinal axis, a transverse axis, a first pair of parallel, spaced bores extending therethrough parallel to the transverse axis for receiving the pins extending from the links, and a retaining member positioned in the block for releasably retaining the circumferential grooves in the pins.

The pusher is L-shaped, having first and second legs. The first leg is provided with mean for adjustably attaching the pusher to the upper surface of the block.

In one aspect of the invention, the retaining member comprises a flexible and resilient U-shaped spring clip having a pair of spaced legs received in a second pair of spaced bores in the block and an intermediate portion which releasably retains the circumferential grooves in the pins.

BRIEF DESCRIPTION OF THE DRAWINGS

The invention is better understood by reading the following detailed description of the preferred embodiments with reference to the accompanying drawing figures, in which like reference numerals refer to like elements throughout, and in which.

DETAILED DESCRIPTION OF THE PREFERRED EMBODIMENTS

Figure 1:
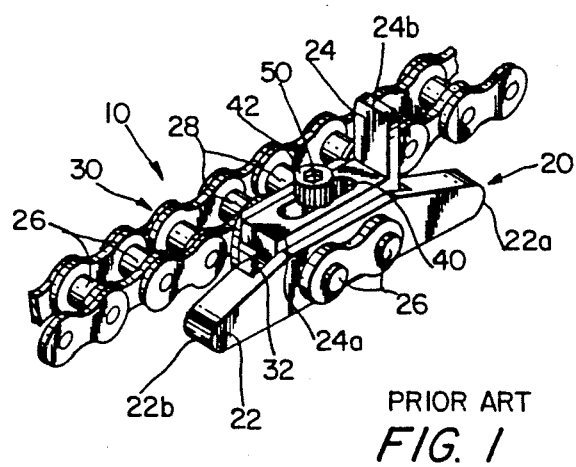
FIG. 1 is a perspective view of a prior art feed chain and block and pusher assembly.
Figure 2:
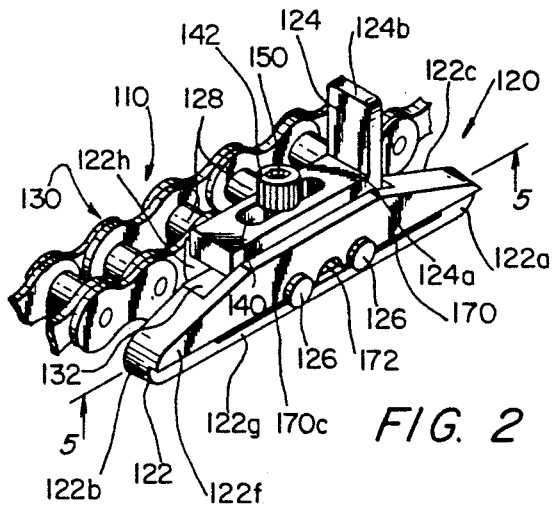
FIG. 2 is a perspective view of a feed chain and block and pusher assembly in accordance with the present invention.
Figure 3:
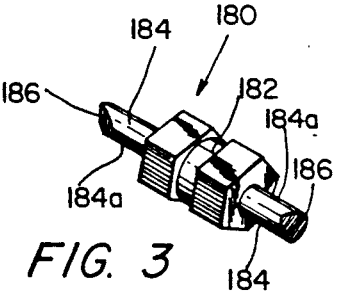
FIG. 3 is a perspective view of a tool for removing the block and pusher assembly of FIG. 2 from the feed chain.

In describing a preferred embodiment of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

Referring now to FIGS. 2 and 4-6C, there is shown a feed or aligner chain 110 and a block and pusher assembly 120 in accordance with the present invention. Feed chain 110 is shown as an ASA standard roller chain. However, is should be understood that feed chain 110 can be any equivalent chain which can be used to drive a conveyor.

Block and pusher assembly 120 comprises a block 122 selectively removable from feed chain 110 and a pusher 124 adjustably attached to block 122. Block 122 includes leading and trailing edges 122a and 122b, upper and lower surfaces 122c and 122d, and inner and outer surfaces 122e and 122f. An inverted, L-shaped notch 122g is formed at the corner between lower surface 122d and outer surface 122f. Inner surface 122e includes a central extension 122h.

Figure 4:
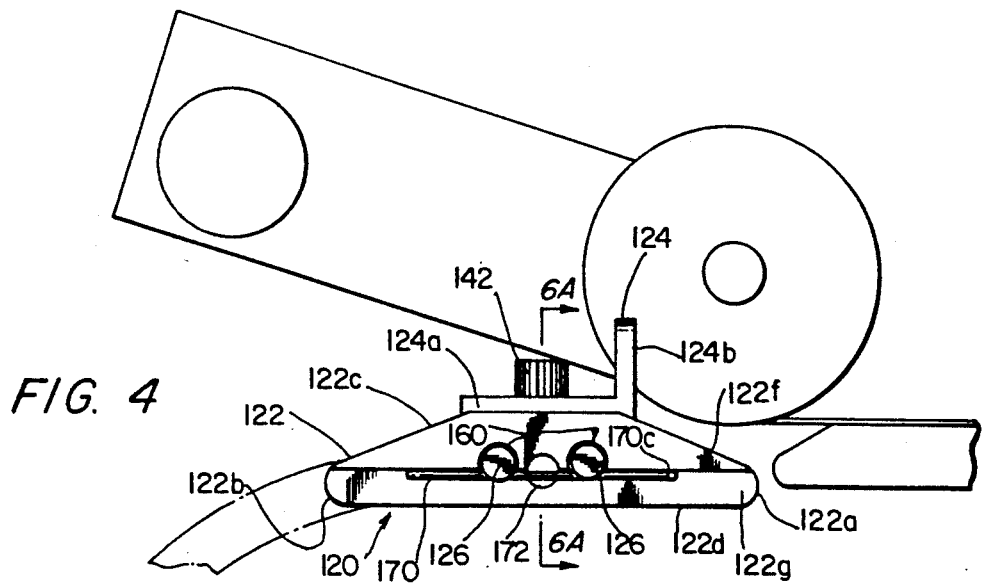
FIG. 4 is a side elevational view of the block and pusher assembly of FIG. 2 in conjunction with a belt drive and a belt of a conventional printing press.
Figure 5:
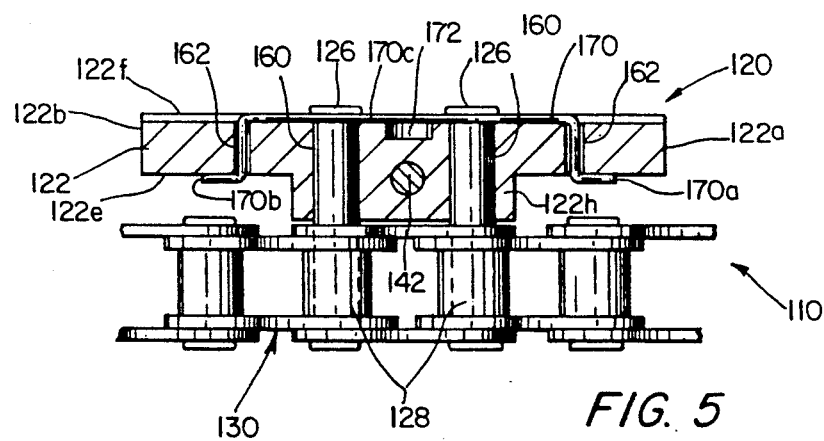
FIG. 5 is a cross-sectional view taken along line 5—5 of FIG. 2.

Block 122 further has a longitudinal axis parallel to surface 122d and extending between leading and trailing edges 122a and 122b; a vertical axis perpendicular to and extending between upper and lower surfaces 122c and 122d; and a transverse axis perpendicular to and extending between inner and outer surfaces 122e and 122f. Block 122 is substantially trapezoidal in vertical cross-section, as shown in FIG. 4; and is substantially T-shaped in transverse cross-section, as shown in FIG. 5.

More specifically, feed chain 110 is provided at predetermined intervals with pins 126 extending through the rollers 128 of links 130, and having a diameter D1. Circumferential grooves 126a (FIG. 6C) are formed adjacent the free ends of pins 126, and have a diameter D2. Block 122 is provided with a mechanism, to be described in detail hereinafter, for selectively engaging grooves 126a, enabling block 122 to be selectively removable from pins 126.

Like prior art block 22, upper surface 122c of block 122 has a recesses 132 provided therein for receiving adjustable pusher 124. Pusher 124 is substantially identical to prior art pusher 24, having an L-shape with a first leg (FIGS. 2 and 4) and a second leg 124b, an elongated slot 140 being formed in first leg 124a.

A pusher screw 142 similar to prior art pusher screw 42 is inserted through slot 140 and engages a threaded bore 146 extending vertically through block 122 parallel to the vertical axis. Pusher screw 142 is provided with a socket 150 (FIG. 2) for engaging a wrench, thus enabling the position of pusher 124 to be selectively adjusted relative to the leading and trailing edges 122a and 122b of block 122, as may be required for proper alignment of pusher 124.

Block 122 in accordance with the present invention is provided with a first pair of parallel, spaced, pin-receiving bores 160 formed parallel to its transverse axis and extending through extension 122h, for slidably receiving pins 126. As can best be seen in FIGS. 4 and 6A, the lower sections of bores 160 intersect the upper portion of notch 122g by a distance along their vertically-extending radii which is approximately equal to D1-D2. Thus, when pins 126 are inserted into bores 160, circumferential grooves 126a align with the top surface of notch 122g.

A second pair of parallel, spaced clip-receiving bores 162 (FIG. 5) is formed through block 122 parallel to its transverse axis at the top of notch 122g. Bores 162 are positioned outwardly of bores 160 and extension 122b, and have a diameter approximately equal to D1-D2.

Block 122 is releasably retained on pins 126 by a spring clip 170. Spring clip 170 is substantially U-shaped, having first and second spaced legs 170a and 170b (FIG. 5) slidably received in and extending through clip-receiving bores 162, and an intermediate portion 170c extending between legs 170a and 170b in the top portion of notch 122g to engage circumferential grooves 126a in pins 126. Legs 170a and 170b preferably are longer than clip-receiving bores 162, the ends of legs 170a and 170b extending outwardly of bores 162 being bent back to retain clip 170 in place in block 122.

Spring clip 170 is preferably formed from a flexible and resilient wire, so that intermediate portion 170c can flex downwardly to disengage from circumferential grooves 124a, and then return to its original position once block 122 is removed from pins 126. Likewise, it can flex downwardly over the ends of pins 126 and then return to its original position to engage circumferential grooves 124a when block 122 is replaced on pins 126.

A third, tool-receiving bore 172 is provided parallel to the transverse axis of block 22 and extending at least partially through block 122. Bore 172 is centered on the top of notch 122g and between bores 160. In order to flex central portion 170c of spring clip 170 downwardly to remove block 122 from pins 126, an exemplary tool 180 is provided for insertion into bore 172, as shown in FIGS. 3 and 6A-6C.

Tool 180 comprises a central gripping portion 182 having a bit 184 extending from either end thereof. Each of bits 184 is substantially cylindrical, having a tapered face 186 at its free end. The plane of one face 186 can be rotated 90° from the plane of the other face 186.

Figure 6A:
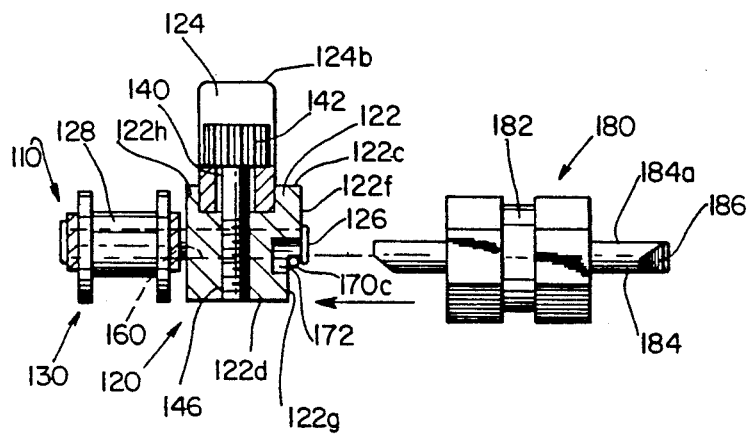
FIG. 6A is a cross-sectional view taken along line 6A—6A of FIG. 4, shown with the tool of FIG. 3 prior to insertion into the block and pusher assembly.
Figure 6B:
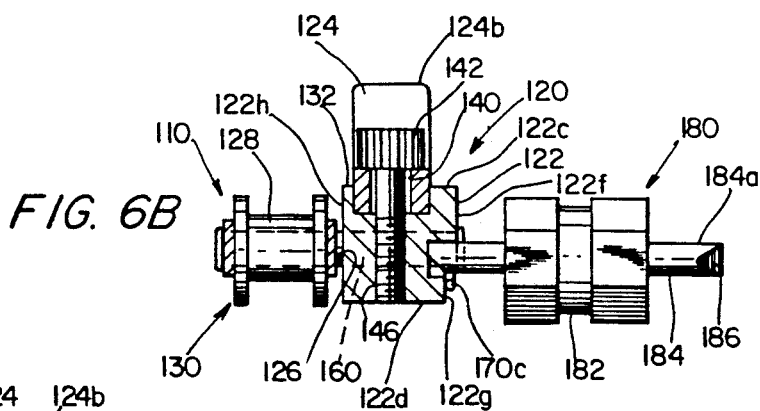
FIG. 6B is a cross-sectional view similar to FIG. 6A, showing the tool of FIG. 3 inserted into the block and pusher assembly.
Figure 6C:
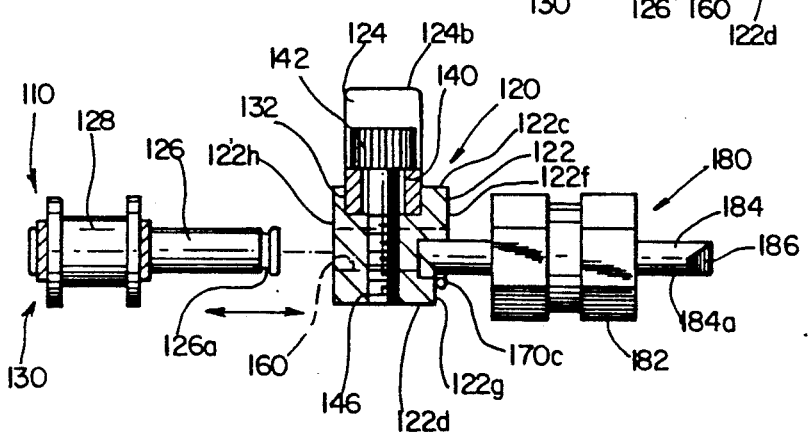
FIG. 6C is a cross-sectional view similar to FIG. 6A, showing the tool of FIG. 3 inserted into the block and pusher assembly, and with the block and pusher assembly removed from the feed chain.

Tool 180 can be inserted into bore 172 with tapered face 186 at any angular position. If tool 180 is inserted into bore 172 with tapered face 186 bearing against intermediate portion 170c of spring clip 170, then it will gradually urge intermediate portion 170c to flex downwardly and out of engagement with circumferential grooves 126a, as shown in FIGS. 6B and 6C. If tool 180 is inserted into bore 172 with tapered face 186 in any other angular position, then it will facilitate sliding of bit 184 into bore 172. Then, as bit 184 is inserted into bore 172, its outer surface 184a will bear against intermediate portion 170c of spring clip 170, again urging intermediate portion 170c downwardly and out of engagement with circumferential groove 126a. Block and pusher assembly 120 can then be removed from pins 126 as shown in FIG. 6C. Thus, removal of block and pusher assembly 120 from pins 126 can be accomplished in seconds.

In order to replace block and pusher assembly 120, bores 160 are aligned with pins 126, and block 122 is pushed inwardly towards feed chain 110. The free ends of pins 126 bear against intermediate portion 170c of spring clip 170 and being slightly rounded or tapered, push it downwardly, allowing intermediate portion 170c to sip past the free ends of pins 126 and into circumferential grooves 126a.

Modifications and variations of the above-described embodiment of the present invention are possible, as appreciated by those skilled in the art in light of the above teachings. It is therefore to be understood, that within the scope of the appended claims and their equivalents, the invention can be practiced otherwise than as specifically described.

What is claimed is:

1. A block and pusher assembly for removable attachment to a feed chain comprising a plurality of links, at least some of the links having a pair of parallel spaced pins extending therefrom, and the pins extending from the links having circumferential grooves formed therein adjacent the free ends thereof, said block and pusher assembly comprising:
   a block having a longitudinal axis and a transverse axis and a pair of parallel, spaced bores extending therethrough parallel to said transverse axis for receiving the pins extending from the links;
   retainer means positioned in said block for releasably retaining the pins in said bores, said retainer means comprising flexible and resilient spring means for releasably engaging the grooves in the pins; and
   pusher means attached to said block for registration with a workpiece;
   wherein said block further includes recess means for receiving a tool for releasing said spring means from engagement with the grooves in the pins.

2. The block and pusher assembly of claim 1, wherein said recess means is positioned between said pair of bores.

3. The block and pusher assembly of claim 1, wherein said block further includes an inner surface adjacent the feed chain and an outer surface opposite said inner surface, said outer surface having a notch formed therein, at least a portion of said retainer means being positioned in said notch.

4. A block and pusher assembly for removable attachment to a feed chain comprising a plurality of links, at least some of the links having a pair of parallel spaced pins extending therefrom and the pins having circumferential grooves formed therein adjacent the free ends of the pins, said pusher comprising:
   a block having a longitudinal axis, a transverse axis, a first pair of parallel, spaced bores extending therethrough parallel to said transverse axis for receiving the pins extending from the links, and a second pair of spaced bores extending therethrough;
   a flexible and resilient, U-shaped spring clip having a pair of spaced legs received in said second pair of spaced bores and an intermediate portion extending between said spaced legs for releasably engaging the grooves in the pins; and
   pusher means attached to said block for registration with a workpiece.

5. The block and pusher assembly of claim 4, wherein said block further includes recess means for receiving a tool for releasing said intermediate portion of said spring clip from engagement with the grooves in the pins.

6. The block and pusher assembly of claim 5, wherein said recess means is positioned between said pair of bores.

7. The block and pusher assembly of claim 4, wherein said block further includes an inner surface adjacent the feed chain and an outer surface opposite said inner surface, said outer surface having a notch formed therein, and said intermediate portion of said spring clip being positioned in said notch.

8. A feed chain assembly for conveying workpieces of different sizes, comprising:
   a feed chain comprising a plurality of links, at least some of said links having a pair of parallel spaced pins extending therefrom, said pins extending from said links having circumferential grooves formed therein adjacent the free ends thereof; and
   at least one block and pusher assembly for removable attachment to said links, comprising a block having a longitudinal axis and a transverse axis and a pair of parallel, spaced bores extending therethrough parallel to said transverse axis for receiving said pins extending from said link, retainer means positioned in said block for releasably retaining said pins in said bores, and pusher means attached to said block for registration with a workpiece, said retainer means comprising flexible and resilient spring means for releasably engaging said grooves in said pins, and said block including recess means for receiving a tool for releasing said spring means from engagement with the grooves in the pins.

9. The block and pusher assembly of claim 8, wherein said recess means is positioned between said pair of bores.

10. The block and pusher assembly of claim 8, wherein said block further includes an inner surface adjacent the feed chain and an outer surface opposite said inner surface, said outer surface having a notch formed therein, at least a portion of said retainer means being positioned in said notch.

11. A feed chain assembly for conveying workpieces of different sizes, comprising:
    a feed chain comprising a plurality of links at least some of said links having a pair of parallel spaced pins extending therefrom, said pins extending from said links having circumferential grooves formed therein adjacent the free ends thereof; and
    at least one block and pusher assembly for removable attachment to said links, comprising a block having a longitudinal axis and a transverse axis and a pair of parallel, spaced bores extending therethrough parallel to said transverse axis for receiving said pins extending from said link, retainer means positioned in said block for releasably retaining said pins in said bores, and pusher means attached to said block for registration with a workpiece, said retainer means comprising flexible and resilient spring means for releasably engaging said grooves in said pins, and said spring means comprising a flexible and resilient U-shaped spring clip having first and second legs extending through said block and an intermediate portion extending between said legs for releasably engaging said grooves.

12. The block and pusher assembly of claim 11, wherein said block further includes recess means for receiving a tool for releasing said intermediate portion of said spring clip from engagement with the grooves in the pins.

13. The block and pusher assembly of claim 12, wherein said recess means is positioned between said pair of bores.

14. The block and pusher assembly of claim 11, wherein said block further includes an inner surface adjacent the feed chain and an outer surface opposite said inner surface, said outer surface having a notch formed therein, and said intermediate portion of said spring clip being positioned in said notch.

* * * * *